(12) United States Patent
Crombez

(10) Patent No.: US 6,278,916 B1
(45) Date of Patent: Aug. 21, 2001

(54) TORQUE CONTROL STRATEGY FOR MANAGEMENT OF CREEP AND GRADE HOLD TORQUE IN A WHEELED VEHICLE WHOSE POWERTRAIN INCLUDES A ROTARY ELECTRIC MACHINE

(75) Inventor: Dale Scott Crombez, Livonia, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/567,358

(22) Filed: May 9, 2000

(51) Int. Cl.$^7$ ................................................. B60L 15/20
(52) U.S. Cl. ................................. 701/22; 701/84; 180/197
(58) Field of Search ................................. 701/22, 83, 84; 303/152, 112, 155; 188/156, 159, 181 T; 180/65.1, 197, 65.3, 282

(56) References Cited

U.S. PATENT DOCUMENTS

| | | | |
|---|---|---|---|
| 4,701,682 | 10/1987 | Hirotsu et al. | 318/52 |
| 4,799,161 | 1/1989 | Hirotsu et al. | 364/426.01 |
| 4,949,820 | 8/1990 | Fontaine et al. | 192/1.23 |
| 4,962,969 | * 10/1990 | Davis | 303/3 |
| 5,294,191 | 3/1994 | Giorgetti et al. | 303/3 |
| 5,376,869 | * 12/1994 | Konrad | 318/587 |
| 5,378,053 | * 1/1995 | Patient et al. | 303/3 |
| 5,446,351 | 8/1995 | Kusano et al. | 180/79.1 |
| 5,457,363 | 10/1995 | Yoshii et al. | 318/432 |
| 5,492,192 | * 2/1996 | Brooks et al. | 180/165 |
| 5,511,859 | * 4/1996 | Kade et al. | 303/3 |
| 5,615,933 | * 4/1997 | Kidston et al. | 303/152 |
| 5,726,890 | 3/1998 | Takomoto et al. | 364/426.01 |
| 5,853,229 | * 12/1998 | Willmann et al. | 303/3 |
| 5,905,349 | 5/1999 | Farkas et al. | 318/432 |
| 6,126,251 | * 10/2000 | Yoshii et al. | 303/152 |

* cited by examiner

Primary Examiner—Tan Nguyen
Assistant Examiner—Dalena Tran
(74) Attorney, Agent, or Firm—Gregory P. Brown; William J. Coughlin

(57) ABSTRACT

A torque control strategy control for management of regenerative braking in a motor vehicle. A first processor (12) processes throttle request data (20) and torque modification data (40) from a second processor (14) to develop motor torque request data (28) for controlling rotary electric machine torque. The second processor processes brake request data (26), the throttle request data, and operating data from the at least one operating data source to develop friction brake torque data (30) for controlling friction brake torque applied to the vehicle and the torque modification data for the first processor. The two processors interact such that as long as the operating data from the at least one operating data source does not require that regenerative braking torque be limited, the torque modification data supplied to the first processor from the second processor equates to the brake torque request data, and the friction brake torque data does not cause the friction brakes to be applied, and when the operating data from the at least one operating data source calls for some limiting of the regenerative braking torque, the amount of limiting is subtracted from the torque modification data and the friction brake torque data equates to that amount of limiting for causing the friction brakes to be applied in that amount. At zero and near-zero speeds grade hold torque is calculated according to a formula and added to the friction torque.

18 Claims, 4 Drawing Sheets

TORQUE CONTROL STRATEGY FOR MANAGEMENT OF CREEP AND GRADE HOLD TORQUE IN A WHEELED VEHICLE WHOSE POWERTRAIN INCLUDES A ROTARY ELECTRIC MACHINE

BACKGROUND OF THE INVENTION

1. Field of the Invention

This invention relates generally to electric vehicles and partial electric vehicles. More specifically, it relates to a comprehensive torque control strategy for management of regenerative braking in such vehicles, including a sub-strategy for control of grade hold and creep torque.

2. Background Information

A wheeled automotive vehicle may comprise one or more electronic modules that control various aspects of powertrain operation. Certain vehicles have a powertrain that includes at least one rotary electric machine. A vehicle that comprises such as a machine as the sole prime mover is commonly referred to as an electric vehicle, and in such a vehicle, batteries or fuel cells are typical power supplies for the electric machine. Vehicles that include an electric machine in association with another prime mover, an internal combustion engine for example, are sometimes called partial electric vehicles or hybrid electric vehicles.

A powertrain control module (PCM) is a name that is sometimes given to an electronic module that processes certain data to control various aspects of powertrain operation. A rotary electric machine may be one device whose operation is under the control of a PCM. Sometimes the electric machine operates as a motor that makes a positive torque contribution to powertrain torque. At other times the electric machine operates as a generator that makes a negative torque contribution to powertrain torque. Positive torque contribution from the electric machine may appear as traction torque delivered through a drivetrain of the vehicle to at least some of the wheels to propel the vehicle. Negative torque contribution from the electric machine may be used to impose braking torque on the drivetrain to brake the vehicle. In a hybrid electric vehicle, positive and negative torque contributions from the electric machine may also be used to smooth torque fluctuations due to combustion events in an associated combustion engine.

When an electric machine imposes braking torque on the drivetrain to brake the vehicle, it is operating as an electric generator. Generated electricity may be used advantageously to regenerate an electric power supply such as a battery or fuel cell. Hence, such braking is commonly referred to as regenerative braking, or sometimes simply regent for short. A vehicle that possesses regenerative braking capability typically does not rely exclusively on such braking for the vehicle service brakes. While some energy recovery is made possible by regenerative braking, it is inappropriate at certain times to invoke regenerative braking. For example, the state of charge (SOC) of a battery, or battery bank, may be such that regenerative electric current from the electric machine should not be fed, either in whole or in part, to the battery or bank. In the absence of a suitable sink for such electric current, an alternate braking means is needed.

Hence, both full and partial electric vehicles employ some form of mechanical brakes, such as friction brakes at individual wheels. Mechanical friction brakes may be hydraulic-, pneumatic-, or electric-operated. It is known to use an electronic brake controller or brake control unit (BCU) to apply relative proportions of regenerative braking and friction braking when braking is called for.

It may be considered desirable, in certain like driving situations, for certain operational characteristics of an electric vehicle to mimic those of a vehicle powered by an internal combustion engine acting through a drivetrain that has an automatic transmission. For example, when an internal combustion engine powered vehicle is operated on a horizontal surface with the automatic transmission in a forward or reverse drive gear, and without either the accelerator pedal or the brake pedal being depressed, it may be deemed desirable for the idling engine to deliver enough torque through the drivetrain to cause the vehicle to accelerate in the direction of the selected gear from zero speed to some calibratable, yet fairly small, running speed at which the torque is just sufficient to maintain that speed. This is often referred to a vehicle creep. Application of the friction brake opposes vehicle creep.

If the vehicle is on an inclined, rather than a horizontal, surface, the amount of inclination will influence vehicle creep. If the degree of inclination were to increase, creep speed would decrease, eventually reaching zero speed at some particular grade, corresponding to holding the grade. Beyond that, the torque would be insufficient to maintain even zero speed, and the vehicle would begin to roll down the grade in the opposite direction from the direction of the selected gear. A driver of the vehicle may see fit to apply friction brakes at any particular time while the vehicle transmission is in a forward or reverse drive with the engine idling, and is especially likely to do so to counter an incipient rollback on a grade.

Operating efficiency is an important consideration in an electric vehicle, especially because a more energy efficient vehicle will enjoy a greater operating range. Creep cancellation, i.e. reducing creep torque as a function of the extent of brake pedal application, is a known strategy for improving efficiency if the brakes are applied during creep, but an overall torque management strategy that includes creep cancellation may not obtain the best a efficiency for other vehicle operating conditions. If a driver begins to two-pedal the vehicle, i.e. to simultaneously, or near-simultaneously, apply the accelerator and brake pedals, operating efficiency may be detrimentally affected.

A preliminary novelty search developed the following U.S. Pat. Nos. 4,701,682; 4,799,161; 4,949,820; 5,294,191; 5,446,351; 5,457,363; 5,726,890; and 5,905,349.

SUMMARY OF THE INVENTION

The present invention relates to a torque control strategy for management of regenerative braking that comprises novel inter-relationships between a PCM and a BCU. The inventive principles provide a comprehensive torque control strategy that includes a sub-strategy for grade hold and creep torque management. It is believed that the inventive principles can contribute to improved overall operating efficiency of an electric vehicle while maintaining grade hold capability.

One general aspect of the invention relates to a motor vehicle comprising road-engaging wheels, a powerplant comprising a rotary electric machine that is operatively coupled through a drivetrain to the road-engaging wheels and that is capable both of delivering traction torque to the wheels and of imposing regenerative braking torque on the wheels, friction brakes for applying friction brake torque to the wheels, a throttle request source, and a brake request source.

At least one operating data source furnishes operating data that, at certain times, calls for limitation of regenerative braking torque. At least one processor processes throttle request data from the throttle request source and torque modification data to develop motor torques request data for controlling rotary electric machine torque and for processing brake request data from the brake request source, the throttle request data, and operating data from the at least one operating data source to develop friction brake torque data for controlling friction brake torque applied to the wheels and the torque modification data for the first electronic module.

As long as the operating data from the at least one operating data source does not require that regenerative braking torque be limited, the torque modification data equates to the brake torque request data from the brake request source, and the friction brake torque data does not cause the friction brakes to be applied. When the operating data from the at least one operating data source calls for some limiting of the regenerative braking torque, the amount of limiting is subtracted from the torque modification data and the friction brake torque data equates to that amount of limiting for causing the friction brakes to be applied in that amount. For vehicle speeds greater than zero speed, but less than or equal to a threshold, a grade hold friction brake torque that is a function of vehicle speed is added to the friction brake torque data.

Another general aspect of the invention relates to a control that implements a grade hold strategy defined by adding grade hold friction brake torque to the friction brake torque data, as mentioned above. Still another aspect relates to this method of including grade hold friction brake torque.

Further aspects will be seen in various features of a presently preferred embodiment of the invention that will be described in detail.

BRIEF DESCRIPTION OF THE DRAWINGS

The drawings that will now be briefly described are incorporated herein to illustrate a preferred embodiment of the invention and a best mode presently contemplated for carrying out the invention.

DESCRIPTION OF THE PREFERRED EMBODIMENT(S)

Figure 1:
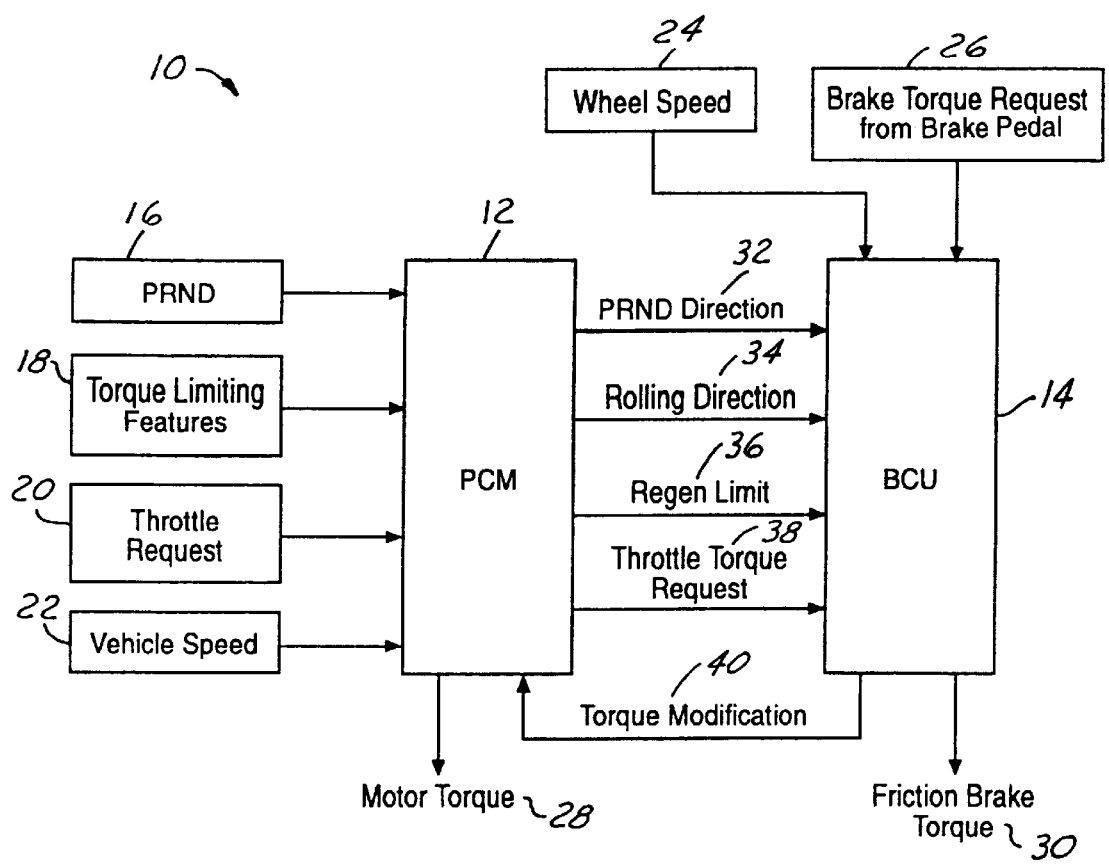
FIG. 1 is a general schematic diagram of a representative torque controller for a vehicle powerplant, including a PCM and BCU.

FIG. 1 shows a representative torque controller 10 for the powerplant of an electric automotive vehicle. It includes a powertrain control module (PCM) 12 and a brake control unit (BCU) 14. It should be appreciated that the descriptive term control module, or control unit, is used in a generic sense, and not in a limiting sense, to designate an electronic unit that comprises an assembly that comprises various electronic components, including a processor, for processing various data inputs and delivering various data outputs to perform selected functions in the manner herein described.

The vehicle powerplant comprises at least one rotary electric machine that can operate either as an electric motor for propelling the vehicle or as an electric generator for braking the vehicle. The vehicle also includes a service brake system for braking the vehicle via the application of friction brakes. Request of the friction brakes may be accomplished in any suitable way, such as by a driver of the vehicle depressing a brake pedal to actuate the brakes via electric-, hydraulic-, or pneumatic-actuation. A drivetrain from the electric motor to driven wheels includes a multi-gear transmission that is selectively operable by the driver to different gears. In the vehicle described here, those gears are Park (P), Reverse (R), Neutral (N), and Drive (D). When placed in Drive, the transmission enables the electric machine, operating as a motor, to propel the vehicle in a forward direction. When placed in Reverse, the transmission enables the electric machine, operating as a motor, to propel the vehicle in a rearward direction. When placed in Park or Neutral, rotary motion cannot be transmitted from the electric machine to the wheels, however it may be decided to allow rotary motion to be transmitted from the wheels to the electric machine while in Park or Neutral. The difference between Park and Neutral is that in the former gear, a means for locking the drivetrain at near zero vehicle speeds (typically with the use of a parking pawl) is applied, while in the latter gear the locking means is not applied. For propelling the vehicle in either forward or reverse, there is an accelerator, or throttle, that is operated by the driver, typically by an accelerator pedal.

Data inputs that are utilized by PCM 12 pursuant to principles of the invention include: selected transmission gear data 16, typically obtained from the transmission and/or its shift mechanism; certain torque limiting factors 18, such as any factor that may inhibit the energy storage device (battery) from receiving or delivering electric current (i.e. high state of charge), or any factor that may inhibit any part of the drivetrain from producing regenerative torque (i.e. drivetrain temperatures, battery temperatures, high voltage limits, etc.); throttle request data 20, typically obtained from a sensor, such as a throttle position sensor, associated with the accelerator pedal; and vehicle speed data 22. Communication of electronic data between various devices in the vehicle occurs via a communication, or data, bus, on which data is broadcast at suitable update rates.

Data inputs that are utilized by BCU 14 pursuant to principles of the invention include: wheel speed data 24, typically obtained from wheel speed sensors; and brake torque request data 26, obtained from any suitable sensor for sensing the extent to which the driver is depressing a brake pedal, i.e. a stroke sensor or a pressure sensor for example. One data output of PCM 12 is motor torque 28 for operating the rotary electric machine as a motor, and one data output of BCU 14 is friction brake torque 30 for operating the friction brakes.

Other data outputs of PCM 12 provide data inputs to BCU 14, and they include: data 32 for distinguishing the placement of the transmission in Drive gear from placement in Reverse gear (Park and Neutral gears may be considered to be Drive gears); data 34 for identifying the actual direction, either forward or reverse, in which the vehicle is moving; data 36 defining a regeneration limit; and data 38 corresponding to the throttle torque request, as modified by certain torque limiting factors, under certain conditions. Another data output of BCU 14 that forms an input to PCM 12 is data 40 that defines a calculated torque modification.

Braking of the vehicle may be accomplished either by the application of the friction brakes at the individual road-engaging wheels, or by regenerative braking that uses kinetic energy of the moving vehicle to operate the electric machine of the powerplant as an electric generator.

Acceleration of the vehicle is requested by depressing the accelerator pedal of the vehicle. The throttle position sensor monitors the extent to which the accelerator pedal is being depressed and in turn generates throttle request data 20. This request may be either torque that would accelerate the vehicle or torque that would decelerate the vehicle. A throttle request and an accelerator request are understood here to be synonymous.

A throttle request that decelerates a vehicle may be generated at certain speeds and at throttle positions at or near lift throttle and simulate the lift throttle deceleration torque that is produced in a vehicle equipped with a conventional internal combustion (IC) engine and transmission. This lift throttle deceleration torque is sometimes referred to as compression braking torque. In the case of a vehicle equipped with a rotary electric machine, the compression braking becomes regenerative compression braking.

PCM 12 controls powertrain torque developed by the vehicle powerplant, in this instance motor torque developed by the rotary electric machine operating as an electric motor. The vehicle powertrain comprises a drivetrain through which torque, as determined by the PCM's control of the powerplant, is applied to road-engaging wheels of the vehicle. The applied torque is the algebraic summation of drive torque (a positive torque), regenerative braking torque (a negative torque), and compression braking torque (a negative torque). Regenerative braking is any form of braking imposed on the powertrain which recovers kinetic energy from the powertrain for immediate use elsewhere or for later use in any of various ways by temporary storage of recovered energy in a suitable on-board storage medium.

It is PCM 12 that maintains control over powertrain torque, and although BCU 14 may request a modification of that torque by torque modification data 40 which it supplies to PCM 12, any requested torque modification data 40 is subject to values of the data which PCM 12 itself furnishes to BCU 14, namely regeneration limit data 36 and throttle torque request data 38, and in any event, PCM 12 will not process requested torque modification data 40 in any situation where it determines that processing of such torque modification request data would be inappropriate for presently prevailing values of all data that PCM 12 utilizes in controlling the powertrain.

Likewise it is BCU 14 that maintains control over friction brake torque, and although PCM 12 may in effect, for various combinations of values of regeneration limit data 36 and throttle torque request data 38 which it calculates, request BCU 14 to request friction brake torque, BCU 14 will not process friction brake torque request data in any situation where it determines that processing of such brake torque request data would be inappropriate for presently prevailing values of all data that BCU 14 utilizes in controlling the friction brakes.

Transfer of data between PCM 12 and BCU 14 may be accomplished by any suitable medium, such as the communication bus, and it is understood that data from all relevant sources is also made available to PCM 12 and BCU 14 on such a data link, even if not expressly shown in the drawings.

Figure 2:
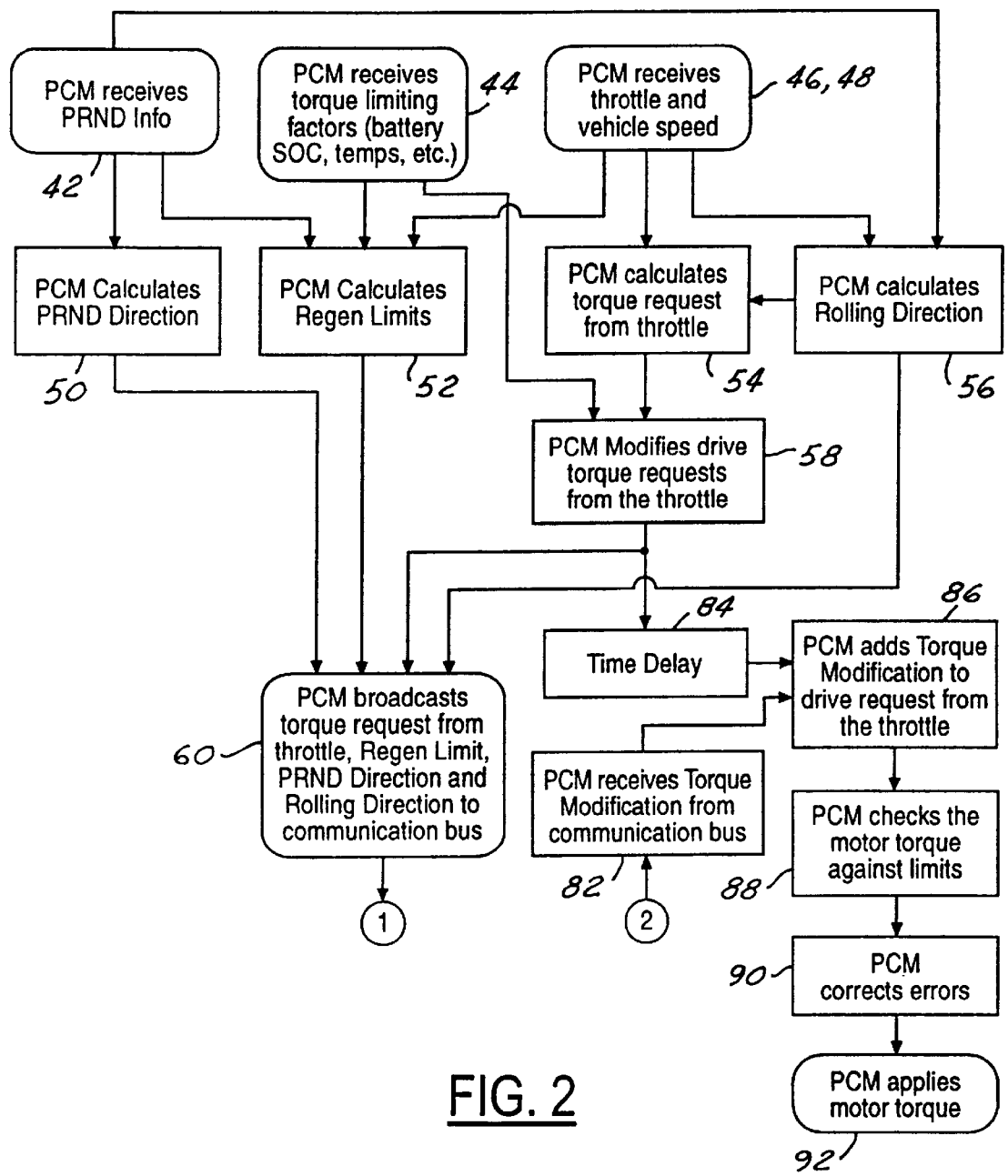
FIG. 2 is a flow diagram representing a comprehensive torque control strategy associated primarily with the PCM, but inter-related with the BCU.

FIG. 2 shows various processing data steps performed by PCM 12. They include: a step 42 of receiving selected transmission gear 16; a step 44 of receiving torque limiting factors 18; a step 46 of receiving throttle request 20; and a step 48 of receiving vehicle speed 22.

PCM 12 performs various calculational steps using that received data, as shown. A step 50 calculates the direction, either forward (D,P,R) or non-forward (N), in which the vehicle will be propelled by the powerplant for the particular selected transmission gear. The result of the calculation is the data signal 32. A step 52 calculates the regeneration limits data, and the result of that calculation is the data signal 36. A step 54 calculates torque request data corresponding to accelerator pedal position, and the result is used in further processing within PCM 12. A step 56 calculates data 34 identifying the actual direction of vehicle motion (either reverse or non-reverse), and that data is both broadcast on the vehicle communication bus and used in further processing by PCM 12.

A step 58 processes the torque request data resulting from step 54 and the torque limiting factor data from step 44 so as to modify the torque request from the accelerator pedal in those circumstances where it is deemed appropriate for torque limiting factors to impose a limitation on such torque request. Hence, step 58 can cause an attenuation in the actual motor drive torque from that requested by the accelerator pedal in situations when factors such as source current limits (for example, battery SOC), temperature, vehicle speed, etc., indicate that the powerplant should not be developing motor torque greater than some limit. The result of step 58 is the throttle torque request data 38. It may be noted that the throttle torque request data 38 may exceed the regent limit data 36 as additional processing of throttle torque request data 38 will be performed. Step 60 shows that the results of calculational steps 50, 52, 56, and 58 are broadcast on the communication bus, or data link, where they are made available to BCU 14.

PCM 12 performs additional processing of the data from step 58 before motor torque data 28 is calculated and broadcast to an electric control circuit associated with the rotary electric machine. That processing provides for the torque modification data 40 from BCU 14 to be taken into account before motor torque data 28 is allowed to be effective on the powerplant. This additional processing will be described later after the ensuing description of FIG. 3 disclosing processing performed by BCU 14.

Figure 3:
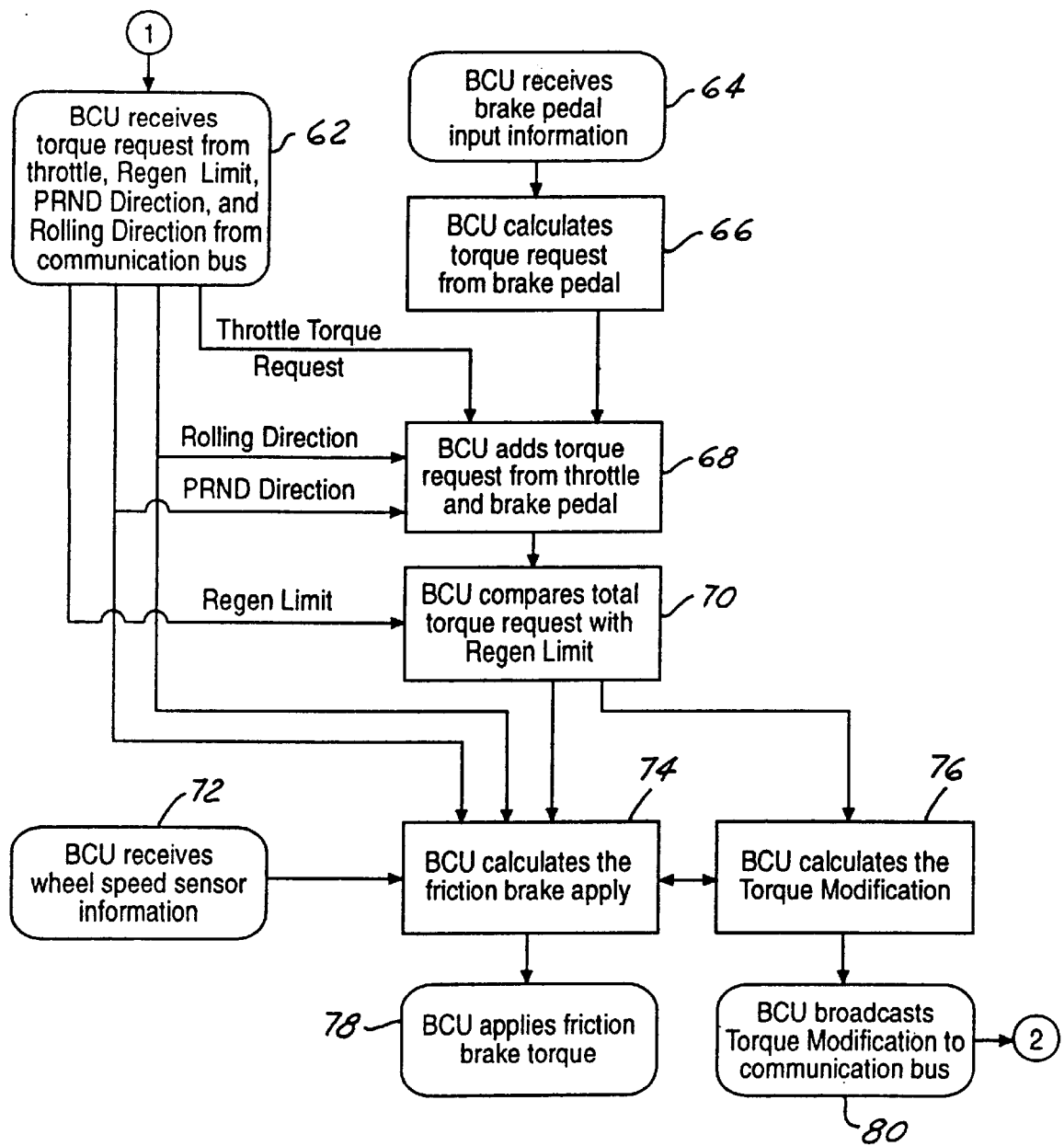
FIG. 3 is a flow diagram representing a comprehensive torque control strategy associated primarily with the BCU, but inter-related with the PCM.

In FIG. 3 a step 62 shows receipt by BCU 14 of the data broadcast by PCM 12 at step 60. A step 64 shows receipt by BCU 14 of brake pedal application data. At step 66, BCU 14 processes the latter data to calculate a corresponding brake torque request. At step 68, the brake torque request data from step 66 is algebraically summed with the throttle torque request data 38 received from PCM 12. Rolling direction and PRND direction may be used in this step 68 to ensure that the torque signs of the throttle torque request and brake torque request are properly accounted for in the calculation. A step 70 compares the total against the regeneration limit data 36 received from PCM 12, and acts to limit the total should the latter exceed the regeneration limit.

Step 72 shows that wheel speed sensor data is also an input to BCU 14. BCU 14 processes that data, the vehicle directional data, and the brake torque request data, as possibly limited by the regeneration limit data, to calculate desired friction brake torque data (step 74) and torque modification data (step 76). The desired friction brake torque calculation of step 74 is used to apply that torque to the friction brakes (step 78). This friction brake torque data 30 represents the braking torque that is beyond the regen limit data 36 and cannot be produced by the powertrain. The torque modification data 40 from step 76 represents the change or modification to the throttle torque request data 38 that is required to ultimately apply appropriate motor torque data 28 and is broadcast on the communication bus (step 80).

PCM 12 receives that broadcast data, as shown by step 82 in FIG. 2. PCM 12 processes the data from step 58, after a time delay (step 84) that takes into account processing time for BCU 14 to process data received from PCM 12 develop and broadcast torque modification data 40, and torque modification data 40 (step 86). The data calculation resulting from step 86 is compared against motor torque limit data (step 88), corrected as appropriate in view of those limits (step 90), and then applied to the rotary electric machine of the powerplant (step 92).

From the foregoing description, it can be understood that PCM 12 processes input data comprising the four data inputs 16, 18, 20, and 22 in FIG. 1 to create output data comprising the four data outputs 32, 34, 36, and 38. That data output is then processed by BCU 14 in conjunction with brake torque request data 26. BCU 14 calculates the total torque demand at the wheels by algebraically summing brake torque request data 26 and throttle torque request data 38. The next task for BCU 14 is to develop torque modification data 40 for use by PCM 12 and friction brake torque data 30 for operating the friction brakes, while assuring that such data is appropriate to relevant torque limiting factors that may call for limiting the extent to which regenerative braking should be invoked.

As long as the torque limiting factors do not require that the regenerative braking torque be limited, the torque modification request data 40 that is supplied to PCM 12 by BCU 14 equates to the brake torque request data 26 from the brake pedal sensor, and the friction brakes are not applied. To the extent that the torque limiting factors call for some limiting of the regenerative braking torque, the amount of limiting is in effect subtracted from what would otherwise be the value of the torque modification data 40, and that amount of limiting is reflected in the friction brake torque data 30 to cause the friction brakes to be applied in that amount. Hence, at any given time, the total torque being produced by the rotary electric machine and the friction brakes is always equal to the total torque being requested by the driver through the brake and accelerator pedal while at the same time, maintaining regenerative braking torque to the regenerative braking limits.

It may be considered desirable, in certain like driving situations, for certain operational characteristics of an electric vehicle to mimic those of a vehicle powered by an internal combustion engine acting through a drivetrain that has an automatic transmission. For example, when an internal combustion engine powered vehicle is operated on a horizontal surface with the automatic transmission in a forward or reverse drive gear, and without either the accelerator pedal or the brake pedal being depressed, it may be deemed desirable for the idling engine to deliver enough torque through the drivetrain to cause the vehicle to accelerate in the direction of the selected gear from zero speed to some calibratable, yet fairly small, running speed at which the torque is just sufficient to maintain that speed. This is often referred to a vehicle creep. Application of the friction brake opposes vehicle creep.

If the vehicle is on an inclined, rather than a horizontal, surface, the amount of inclination will influence vehicle creep. If the degree of inclination were to increase, creep speed would decrease, eventually reaching zero speed at some particular grade, corresponding to holding the grade. Beyond that, the torque would be insufficient to maintain even zero speed, and the vehicle would begin to roll down the grade in the opposite direction from the direction of the selected gear. A driver of the vehicle may see fit to apply friction brakes at any particular time while the vehicle is operating on a grade with its engine idling, and is likely to do so to counter an incipient rollback.

Operating efficiency is an important consideration in an electric vehicle, especially because a more energy efficient vehicle will enjoy a greater operating range. Creep cancellation, i.e. reducing creep torque as a function of the extent of brake pedal application, is a known strategy for improving efficiency if the brakes are applied during creep, but an overall torque management strategy that includes creep cancellation may not obtain the best efficiency for other vehicle operating conditions.

If a driver begins to two-pedal the vehicle, i.e. simultaneously, or near-simultaneously, apply the accelerator and brake pedals, operating efficiency may be detrimentally affected.

The present invention is directed toward a torque management strategy that takes creep and grade hold into account in improved ways in an electric vehicle in the context both of creep and grade hold strategy and of overall torque management strategy.

From the standpoint of overall torque management strategy, a torque management system that comprises a PCM and a BCU, as described above, may be deemed advantageous because of the creation and use of torque cancellation, i.e. the cancellation torque from the BCU, as disclosed. In the context of that strategy, creep cancellation may be viewed as a subset of the cancellation torque. It is believed that implementation of the inventive creep and grade hold strategy, especially as a sub-strategy within the comprehensive torque management strategy represented by FIGS. 1–3, yields an overall more efficient, more properly responsive control system for an electric vehicle.

For mimicking the creep of an internal combustion engine powered vehicle so as to avoid vehicle rollback on a grade within a range extending from zero grade up to some predefined grade, creep is introduced into an electric vehicle by PCM 12 calling for the rotary electric machine to develop a certain amount of positive torque at 0% throttle and zero vehicle speed. With the vehicle on a horizontal surface, that torque is sufficient to accelerate the vehicle, and as vehicle speed increases, may be reduced to some value at which a certain creep speed will be maintained without any further acceleration. But to hold the vehicle stopped on a grade within that range without creep requires the driver to depress the brake pedal. Likewise, holding the vehicle stopped on a grade that exceeds the grade hold capability of the creep may be accomplished by additional accelerator pedal input (i.e. more drive torque) or by additional brake pedal input (i.e. more brake torque). To the extent that the brake pedal depression is effective, via the processing of modification torque 40 by PCM 12, to reduce motor torque 28 by canceling creep and/or additional accelerator pedal input, improved vehicle efficiency is obtained during such conditions. But when creep cancellation and/or torque cancellation is/are inherent in a comprehensive torque management strategy, the possibility arises, under certain conditions, one of which is at zero, or near zero, forward vehicle speed on a grade, that creep and/or accelerator pedal torque cancellation resulting from brake pedal depression may cause loss of potential grade hold torque, resulting in the vehicle rolling backward down the grade, while the brake pedal is being depressed. Therefore, a comprehensive torque management strategy that derives and then uses cancellation torque, as defined above, but that also introduces additional grade hold torque in accordance with principles of the present invention, can provide an improved, more efficient solution for better overall vehicle efficiency and operation, particularly when the vehicle is creeping upward and/or stopped on a grade.

According to a presently preferred embodiment of principles of the present invention, the comprehensive torque management strategy of FIGS. 1–3 is utilized, without regard to creep and grade hold when the vehicle speed is greater than some threshold. This threshold, or speed constant, may be calibrated, depending on preferred vehicle performance characteristics and does not necessarily have to correspond to the speed which the vehicle achieves on a level surface when allowed only to creep. For vehicle speeds greater than zero speed, but less than or equal to the calibratable threshold, a grade hold friction brake torque is developed according to a formula. That formula defines the grade hold friction brake torque to be unity minus vehicle speed divided by the calibratable threshold, multiplied by canceled torque, in other words $$T_{GH} = \left[1 - \frac{w}{w_{th}}\right] * T_c$$

When the vehicle speed is zero, grade hold friction torque will be equal to the canceled torque, and when vehicle speed is equal to or greater than the calibratable threshold, grade hold friction torque will be zero. Between zero vehicle speed and the calibratable threshold speed, the value of grade hold torque will lie between the two limits. Although the grade hold friction torque is an inverse linear function of vehicle speed, other formulae relating grade hold friction torque and vehicle speed may be utilized. Furthermore, a formula for computed grade hold friction torque may also include a modifier (a multiplication factor for example) to proportionately increase or decrease its value for improving transient response interactions with the vehicle powertrain in response to changing accelerator and/or brake pedal inputs.

Figure 4:
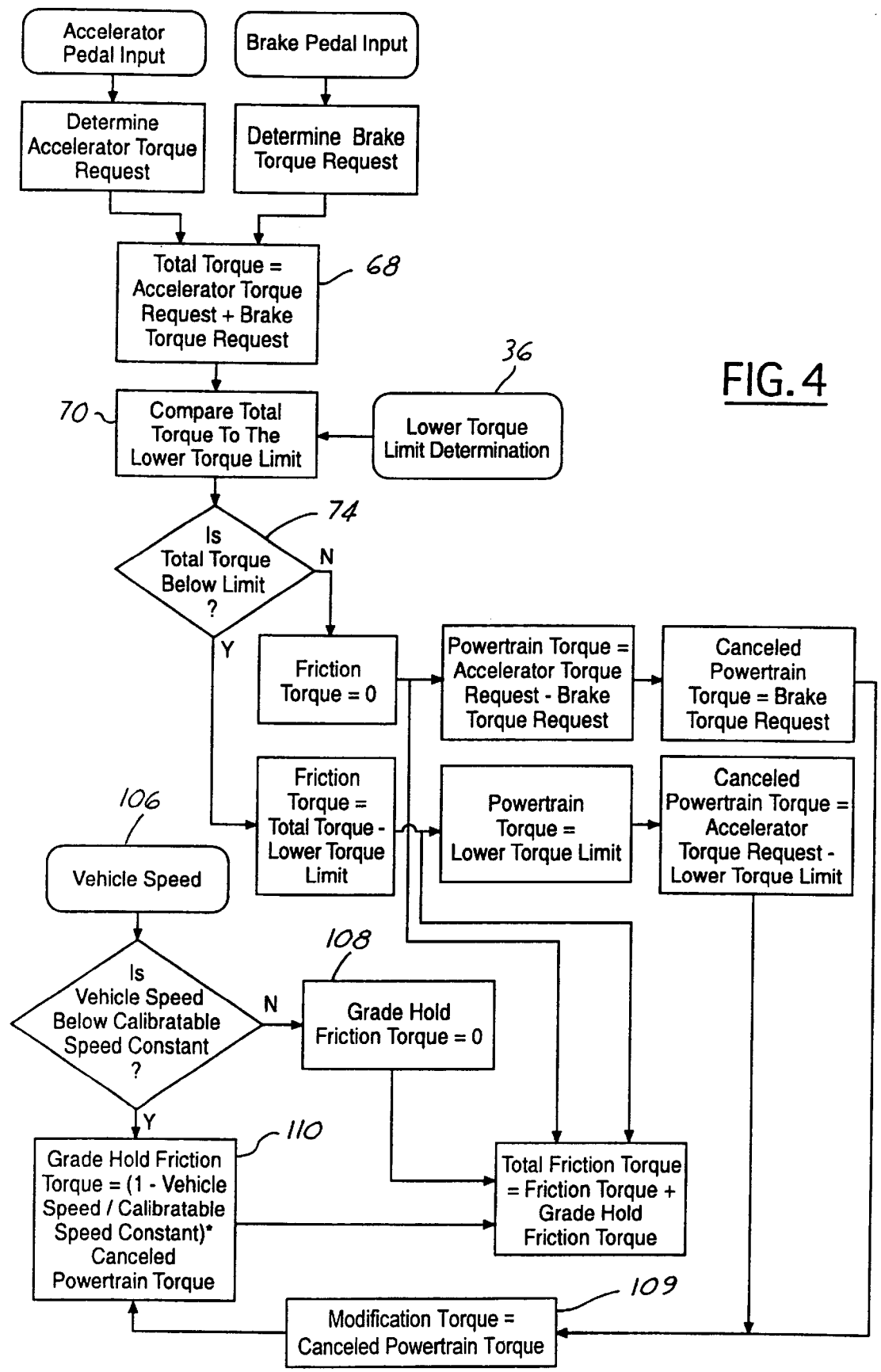
FIG. 4 is flow diagram implementing a grade hold and creep torque sub-strategy with the comprehensive torque control strategy, in accordance with principles of the present invention.

FIG. 4 shows how grade hold friction brake torque is implemented in the comprehensive torque management strategy. Torque corresponding to the throttle request and torque corresponding to the brake pedal request are algebraically summed to yield Total Torque which corresponds to step 68 of FIG. 3 and which is marked in FIG. 4 by the same reference numeral. Then as in FIG. 3, the Total Torque is compared (step 70) with a Lower Torque Limit corresponding to regen limit data 36 and marked by the same reference numeral. Next, Friction Torque is determined as a result of a comparison step 74, corresponding to the like numbered step in FIG. 3.

If Total Torque is greater than or equal to the Lower Torque Limit, then the value of Friction Torque is set to zero so that the friction brakes are not applied and the Powertrain Torque is made equal to the difference between the Throttle Request Torque and the Brake Request Torque and the Cancellation Torque is made equal to the Brake Request Torque, in the same manner as FIGS. 2 and 3.

On the other hand, if the Total Torque is less than the Lower Torque Limit 36, then the consequence of step 74 is to cause Friction Torque to equal Total Torque minus the Lower Torque Limit, the Powertrain Torque to equal the Lower Torque Limit, and the Cancellation Torque to equal Throttle Torque Request data 38 minus Lower Torque Limit 36.

FIG. 4 further shows that vehicle speed is repeatedly monitored by a step 106. Whenever the vehicle speed is greater than or equal to the calibratable grade hold threshold, then the basic torque management strategy is executed, and grade hold friction torque is not a factor (step 108). However, when the vehicle speed is less than the grade hold threshold, then grade hold friction torque is introduced as a factor (step 110) in the determination of Total Friction Torque. Step 110 utilizes the specific formula given above. The preceding step 109 indicates that canceled powertrain (rotary electric machine) torque $T_C$ is the modification torque utilized.

While a presently preferred embodiment has been illustrated and described, it is to be appreciated that the invention may be practiced in various forms within the scope of the following claims. For example, the inventive grade hold friction torque may be applied to any comprehensive torque management strategy where torque cancellation would otherwise cause the loss of grade hold torque at and near zero vehicle speed.

What is claimed is:

1. A motor vehicle comprising:
   road-engaging wheels;
   a powerplant comprising a rotary electric machine that is operatively coupled through a drivetrain to the road-engaging wheels and that is capable both of delivering traction torque to the wheels and of imposing regenerative braking torque on the wheels;
   friction brakes for applying friction brake torque to the wheels;
   a throttle request source;
   a brake request source; a
   at least one operating data source furnishing operating data that, at certain times, calls for limitation of regenerative braking torque;
   at least one processor for processing throttle request data from the throttle request source and torque modification data to develop motor torque request data for controlling rotary electric machine torque and for processing brake request data from the brake request source, the throttle request data, and operating data from the at least one operating data source to develop friction brake torque data for controlling friction brake torque applied to the wheels and the torque modification data;
   wherein as long as the operating data from the at least one operating data source does not require that regenerative braking torque be limited, the torque modification data equates to the brake torque request data from the brake request source, and the friction brake torque data does not cause the friction brakes to be applied, and when the operating data from the at least one operating data source calls for some limiting of the regenerative braking torque, the amount of limiting is subtracted from the torque modification data and the friction brake torque data equates to that amount of limiting for causing the friction brakes to be applied in that amount; and
   wherein for vehicle speeds greater than zero speed, but less than or equal to a threshold, a grade hold friction brake torque that is a function of vehicle speed is added to the friction brake torque data.

2. A motor vehicle as set forth in claim 1 in which the grade hold friction brake torque is determined by a formula.

3. A motor vehicle as set forth in claim 2 in which the formula is $$T_{GH} = \left[1 - \frac{w}{w_{th}}\right] * T_c$$

where $T_{GH}$ is the grade hold friction brake torque, $T_C$ is canceled rotary electric machine torque that corresponds to the torque modification, ω is vehicle speed, and $ω_{th}$ is the threshold.

4. A motor vehicle as set forth in claim 2 in which the threshold is calibratable.

5. A motor vehicle as set forth in claim 2 including a applying a multiplication factor to the formula to proportionately increase or decrease the formula result in response to changing throttle and brake requests.

6. A motor vehicle as set forth in claim 2 in which the formula comprises the grade hold friction brake torque having an inverse functional relationship to vehicle speed.

7. A control for a motor vehicle that has road-engaging wheels, a powerplant that includes a rotary electric machine that is operatively coupled through a drivetrain to the road-engaging wheels and that is capable both of delivering traction torque to the wheels and of imposing regenerative braking torque on the wheels, and friction brakes for applying friction brake torque to the wheels, the control comprising:

a throttle request source;

a brake request source;

at least one processor for processing throttle request data from the throttle request source and torque modification data to develop motor torque request data for controlling rotary electric machine torque and for processing at least brake request data from the brake request source and the throttle request data to develop friction brake torque data for controlling friction brake torque applied to the wheels and the torque modification data;

wherein the torque modification data equates to the brake torque request data from the brake request source when regenerative braking torque is not being limited, and the friction brake torque data does not cause the friction brakes to be applied, and when the regenerative braking torque is being limited, the amount of limiting is subtracted from the torque modification data and the friction brake torque data equates to that amount of limiting for causing the friction brakes to be applied in that amount; and wherein for vehicle speeds greater than zero speed, but less than or equal to a threshold, a grade hold friction brake torque that is a function of vehicle speed is added to the friction brake torque data.

8. A control as set forth in claim 7 in which the grade hold friction brake torque is determined by a formula.

9. A control as set forth in claim 8 in which in which the formula is $$T_{GH} = \left[1 - \frac{w}{w_{th}}\right] * T_c$$

where $T_{GH}$ is the grade hold friction brake torque, $T_C$ is canceled rotary electric machine torque that corresponds to the torque modification, $\omega$ is vehicle speed, and $\omega_{th}$ is the threshold.

10. A control as set forth in claim 8 in which the threshold is calibratable.

11. A control as set forth in claim 8 including applying a multiplication factor to the formula to proportionately increase or decrease the formula result in response to changing throttle and brake requests.

12. A control as set forth in claim 8 in which the formula comprises the grade hold friction brake torque having an inverse functional relationship to vehicle speed.

13. A method of operating a motor vehicle that has road-engaging wheels, a powerplant comprising a rotary electric machine that is operatively coupled through a drivetrain to the road-engaging wheels and that is capable both of delivering traction torque to the wheels and of imposing regenerative braking torque on the wheels, and friction brakes for applying friction brake torque to the wheels, a throttle request source, a brake request source, and at least one operating data source furnishing operating data that, at certain times, calls for limitation of regenerative braking torque, the method comprising:

processing throttle request data from the throttle request source and torque modification data, to develop motor torque request data for controlling rotary electric machine torque;

processing brake request data from the brake request source, the throttle request data, and operating data from the at least one operating data source to develop friction brake torque data for controlling friction brake torque applied to the wheels and the torque modification data;

wherein as long as the operating data from the at least one operating data source does not require that regenerative braking torque be limited, the torque modification data equates to the brake torque request data from the brake request source, and the friction brake torque data does not cause the friction brakes to be applied, and when the operating data from the at least one operating data source calls for some limiting of the regenerative braking torque, the amount of limiting is subtracted from the torque modification data and the friction brake torque data equates to that amount of limiting for causing the friction brakes to be applied in that amount; and when vehicle speed is greater than zero speed, but less than or equal to a threshold, adding a grade hold friction brake torque that is a function of vehicle speed to the friction brake torque data.

14. A method as set forth in claim 13 including determining the grade hold friction brake torque according to a formula.

15. A method as seaport in claim 14 in which in which the formula is $$T_{GH} = \left[1 - \frac{w}{w_{th}}\right] * T_c$$

where $T_{GH}$ is the grade hold friction brake torque, $T_C$ is canceled rotary electric machine torque that corresponds to the torque modification, $\omega$ is vehicle speed, and $\omega_{th}$ is the threshold.

16. A method as set forth in claim 14 including calibrating the threshold.

17. A method as set forth in claim 14 including applying a multiplication factor to the formula to proportionately increase or decrease the formula result in response to changing throttle and brake requests.

18. A method as set forth in claim 14 in which the formula comprises the grade hold friction brake torque having an inverse functional relationship to vehicle speed.

* * * * *